United States Patent
Hodges et al.

(10) Patent No.: US 7,509,373 B2
(45) Date of Patent: Mar. 24, 2009

(54) METHODS FOR PROVIDING COMMUNICATIONS SERVICES

(75) Inventors: Donna K. Hodges, Cumming, GA (US); Barrett Morris Kreiner, Norcross, GA (US); Steven N. Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 732 days.

(21) Appl. No.: 10/720,800

(22) Filed: Nov. 24, 2003

(65) Prior Publication Data

US 2005/0114439 A1 May 26, 2005

(51) Int. Cl.
G06F 15/177 (2006.01)
H04N 5/445 (2006.01)
H04N 7/173 (2006.01)
H04J 3/16 (2006.01)

(52) U.S. Cl. ............... 709/203; 709/220; 709/222; 709/238; 725/38; 725/91; 725/111

(58) Field of Classification Search ............ 709/246, 709/229; 725/111
See application file for complete search history.

(56) References Cited

U.S. PATENT DOCUMENTS

| | | | |
|---|---|---|---|
| 5,752,186 A | 5/1998 | Malackowski et al. | |
| 5,790,176 A | 8/1998 | Craig | |
| 5,862,471 A | 1/1999 | Tiedemann et al. | |
| 5,970,121 A | 10/1999 | Homayoun | |
| 5,978,780 A | 11/1999 | Watson | |
| 6,002,689 A | 12/1999 | Christie | |
| 6,016,307 A * | 1/2000 | Kaplan et al. | 370/238 |
| 6,058,301 A | 5/2000 | Daniels | |
| 6,104,718 A | 8/2000 | Christie | |
| 6,178,170 B1 | 1/2001 | Duree | |
| 6,285,871 B1 | 9/2001 | Daniels | |
| 6,385,198 B1 * | 5/2002 | Ofek et al. | 370/389 |
| 6,421,714 B1 | 7/2002 | Rai et al. | |
| 6,456,594 B1 | 9/2002 | Kaplan | |
| 6,516,194 B2 | 2/2003 | Hanson | |
| 6,519,693 B1 | 2/2003 | Debey | |
| 6,522,883 B2 | 2/2003 | Titmuss | |
| 6,535,592 B1 | 3/2003 | Snelgrove | |
| 6,567,375 B2 | 5/2003 | Balachandran | |
| 6,738,815 B1 | 5/2004 | Willis et al. | |
| 6,836,465 B2 | 12/2004 | Rajan et al. | |
| 6,917,628 B2 * | 7/2005 | McKinnin et al. | 370/468 |
| 6,934,530 B2 | 8/2005 | Engelhart | |
| 6,950,847 B2 | 9/2005 | Harrisville-Wolff et al. | |

(Continued)

FOREIGN PATENT DOCUMENTS

WO   WO 00/41426   7/2000

Primary Examiner—Tonia L Dollinger
Assistant Examiner—Anish Sikri
(74) Attorney, Agent, or Firm—Scott P. Zimmerman, PLLC

(57) ABSTRACT

Methods, systems, and products are disclosed for providing communications services. One method receives a request for electronic data, and the request for electronic data originating from a client communications device. The availability of network routing is assessed in real-time to fulfill the request. The availability of network bandwidth is assessed in real-time to fulfill the request. A preferred scenario of segmentation, dispersion, and assemblage of electronic data is ascertained to fulfill the request. Electronic data fulfilling the request is communicated to the client communications device, with the electronic data formatted according to the preferred scenario.

13 Claims, 14 Drawing Sheets

U.S. PATENT DOCUMENTS

| | | |
|---|---|---|
| 6,957,226 B2 | 10/2005 | Attias |
| 6,978,308 B2 | 12/2005 | Boden et al. |
| 7,043,225 B1 | 5/2006 | Patel et al. |
| 7,155,517 B1 | 12/2006 | Koponen |
| 7,184,548 B2 | 2/2007 | Wee et al. |
| 7,289,489 B1 | 10/2007 | Kung et al. |
| 2001/0029544 A1 | 10/2001 | Cousins |
| 2002/0073182 A1 | 6/2002 | Zakurdaev et al. |
| 2002/0087674 A1 | 7/2002 | Guilford |
| 2002/0112060 A1* | 8/2002 | Kato .......................... 709/227 |
| 2002/0138418 A1 | 9/2002 | Zarin et al. |
| 2002/0146102 A1 | 10/2002 | Lang |
| 2002/0164018 A1 | 11/2002 | Wee |
| 2002/0176378 A1 | 11/2002 | Hamilton |
| 2003/0012376 A1 | 1/2003 | Wee |
| 2003/0043815 A1 | 3/2003 | Tinsley |
| 2003/0051054 A1* | 3/2003 | Redlich et al. .............. 709/246 |
| 2003/0055723 A1 | 3/2003 | English |
| 2003/0088778 A1 | 5/2003 | Lindqvist |
| 2003/0093550 A1 | 5/2003 | Lebizay |
| 2003/0093790 A1* | 5/2003 | Logan et al. .................. 725/38 |
| 2003/0126610 A1* | 7/2003 | Ando .......................... 725/91 |
| 2003/0143978 A1 | 7/2003 | Cooper et al. |
| 2003/0211856 A1 | 11/2003 | Zilliacus |
| 2003/0233332 A1 | 12/2003 | Keeler et al. |
| 2004/0019900 A1 | 1/2004 | Knightbridge et al. |
| 2004/0132449 A1 | 7/2004 | Kowarsch |
| 2004/0139208 A1 | 7/2004 | Tuli |
| 2004/0160932 A1 | 8/2004 | Yegoshin |
| 2004/0221053 A1 | 11/2004 | Codella et al. |
| 2004/0249927 A1 | 12/2004 | Pezutti |
| 2004/0267686 A1 | 12/2004 | Chayes |
| 2005/0038637 A1 | 2/2005 | Balakrishnan |
| 2005/0060420 A1* | 3/2005 | Kovacevic .................. 709/231 |
| 2005/0094725 A1 | 5/2005 | Hui |
| 2006/0031515 A1 | 2/2006 | Van Gassel et al. |
| 2006/0041679 A1 | 2/2006 | Feig |
| 2006/0206619 A1* | 9/2006 | Dan et al. .................... 709/233 |
| 2007/0203844 A1 | 8/2007 | Kuhn et al. |
| 2007/0299771 A1 | 12/2007 | Brody et al. |

* cited by examiner

METHODS FOR PROVIDING COMMUNICATIONS SERVICES

CROSS-REFERENCE TO RELATED APPLICATIONS

This application relates to the copending and the commonly assigned U.S. application Ser. No. 10/720,941, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,949, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,586, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,780, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,956, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,946, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,587, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,892, entitled "Methods for Providing Communications Services", filed concurrently herewith, and of which the "Brief Summary of the Invention" section and the "Detailed Description of the Invention" section are incorporated herein by reference.

BACKGROUND OF THE INVENTION

1. Field of the Invention

This invention generally relates to computers and to communications and, more particularly, to processing data in a communications network.

2. Description of the Related Art

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

BRIEF SUMMARY OF THE INVENTION

The aforementioned problems, and other problems, are reduced by a Analysis Module. This Analysis Module comprises methods, computer systems, computer programs, and computer program products that provide communications services to subscribers. Each time a subscriber requests communications service, the Analysis Module on-demand, dynamically, and in real-time, assesses the subscriber's communications needs and the real-time state of one or more communications networks. The Analysis Module then ascertains the best or preferred scenario for providing that communications service. The subscriber might even have a Service Level Agreement, so this invention ascertains how to utilize the available network routing and bandwidth to satisfy the Service Level Agreement. This invention ascertains the best or preferred scenario for segmentation of data, how that segmented data should be processed, and how the segmented and processed data should be reassembled, again according to the subscriber's Service Level Agreement.

This invention discloses methods, systems, and products for providing communications services. One of the embodiments describes a method for providing communications services. This method receives a request for electronic data, and the request for electronic data originating from a client communications device. The availability of network routing is assessed in real-time to fulfill the request. The availability of network bandwidth is assessed in real-time to fulfill the request. A preferred scenario of segmentation, dispersion, and assemblage of electronic data is ascertained to fulfill the request. Electronic data fulfilling the request is communicated to the client communications device, with the electronic data formatted according to the preferred scenario.

Other embodiments of this invention describes another method for providing communications services. Here a first data stream is received at a computer, and the first data stream includes packets of data packetized according to a packet protocol. The first data stream is segmented into segments according to a Service Level Agreement. The Service Level Agreement being an agreement defining parameters for communications service for the subscriber. At least one segment is dispersed via a network for a subsequent processing service. A result of the processing service is received. A second data stream is assembled, and the second data stream includes at least one of i) the result of the processing service and ii) another segment. The second data stream is then communicated via the network.

Other embodiments of this invention describe a system for providing communications services. The system includes a Analysis Module stored in a memory device, and a processor communicates with the memory device. The Analysis Module receives a first data stream at a computer, and the first data stream comprises packets of data packetized according to a packet protocol. The Analysis Module segments the first data stream into segments according to a Service Level Agreement. The Service Level Agreement being an agreement defining parameters for communications service for the subscriber. The Analysis Module disperses at least one segment via a network for a subsequent processing service, and the Analysis Module receives a result of the processing service. The Analysis Module assembles a second data stream, and the second data stream includes at least one of i) the result of the processing service and ii) another segment. The Analysis Module then communicates the second data stream via the network.

Other embodiments of this invention describe a computer program product. A computer-readable medium stores a Analysis Module. The Analysis Module receives a first data stream at a computer, and the first data stream includes packets of data packetized according to a packet protocol. The Analysis Module segments the first data stream into segments according to a Service Level Agreement. The Service Level Agreement being an agreement defining parameters for communications service for the subscriber. The Analysis Module disperses at least one segment via a network for a subsequent processing service, and the Analysis Module receives a result of the processing service. The Analysis Module then assembles a second data stream comprising at least one of i) the result of the processing service and ii) another segment, and the Analysis Module communicates the second data stream via the network.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
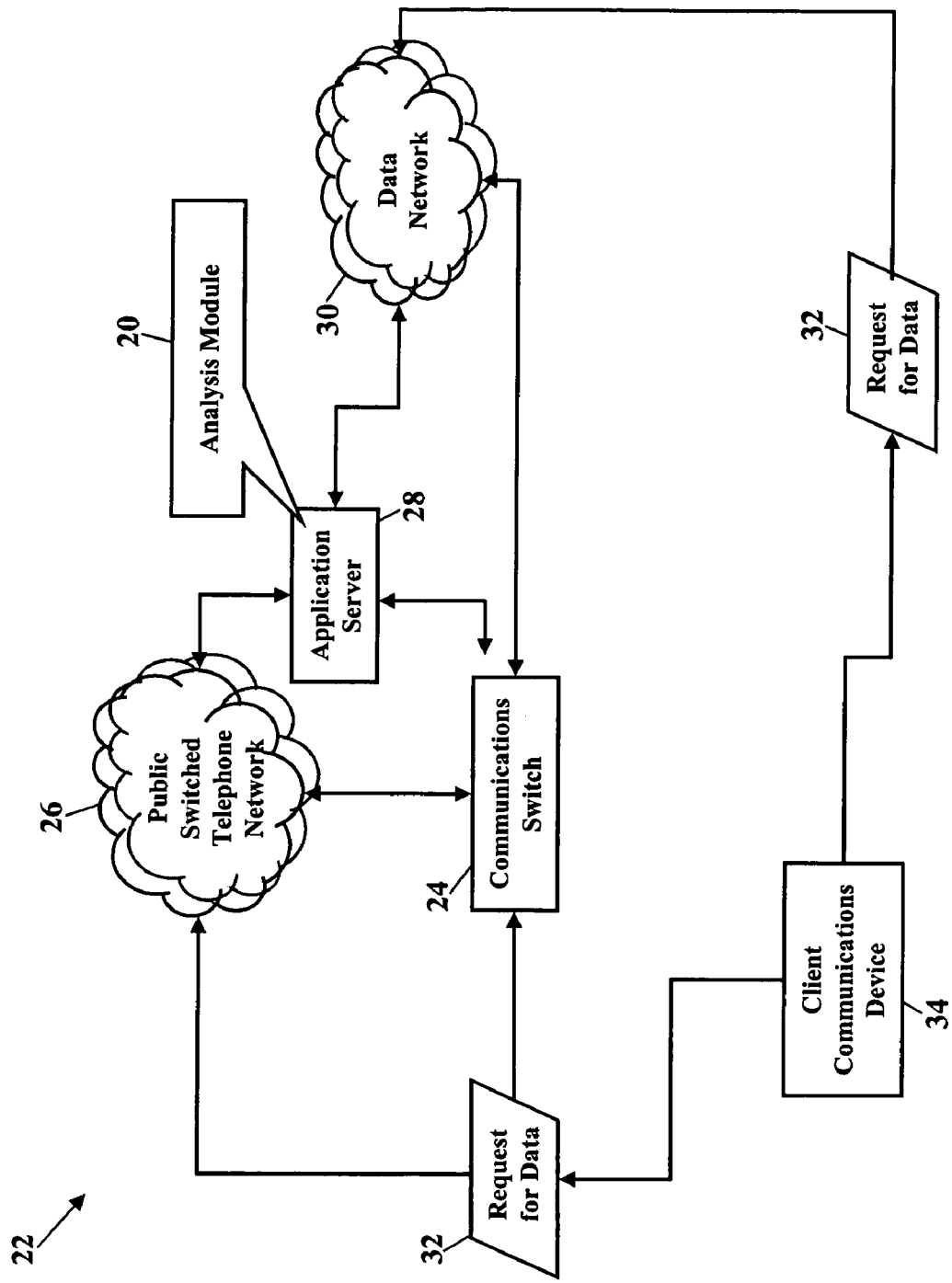
FIG. 1 is a schematic illustrating a Analysis Module operating within an intelligently-controlled communications network, according to one of the embodiments of this invention.

FIGS. 1-4 are schematics illustrating one of the embodiments of this invention. FIG. 1 shows a Analysis Module 20 operating within an intelligently-controlled communications network 22. This communications network 22 represents just one of the possible operating environments for the Analysis Module 20. The Analysis Module 20 comprises methods, computer systems, computer programs, and computer program products that provide communications services to subscribers. Each time a subscriber requests communications service, the Analysis Module 20 dynamically, and in real-time, assesses the subscriber's communications needs and the real-time state of the communications network 22. The Analysis Module 20 then determines the best or preferred scenario for providing that requested communications service. If the subscriber has a Service Level Agreement, the Analysis Module 20 determines how to utilize the available network routing/bandwidth to satisfy the Service Level Agreement. As this patent will explain, the Analysis Module 20 assesses the highest quality scenario, the most reliable scenario, the most efficient scenario, the most profitable scenario, or, in general terms, the "preferred scenario" for providing the subscriber's requested communications service that also satisfies the Service Level Agreement.

FIG. 1 shows the Analysis Module 20 operating within the communications network 22. The communications network 22 includes a communications switch 24 of a Public Switched Telephone Network 26. The communications switch 24 interfaces with an application server 28. The Analysis Module 20 is stored within the memory of the application server 28. The application server 28 controls many features of the communications switch 24. The application server 28, for example, may include Advanced Intelligent Network (AIN) componentry (not shown for simplicity). The application server 28 additionally or alternatively may include and/or voice service protocols, triggers, and/or operations for a "softswitch" packet-network architecture. The communications switch 24 and the application server 28 interface with the Public Switched Telephone Network 26 and a data network 30. Because the application server 28 communicates with Public Switched Telephone Network 26 and the data network 30, the Analysis Module 20 receives data via either network 26, 30. The signaling between the communications switch 24, the Public Switched Telephone Network 26, the application server 28, and the data network 30, however, is well understood in the art and will not be further described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

FIG. 1 also shows the Analysis Module 20 receiving a request 32 for data. The term "data" includes electronic information, such as, for example, facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others. The request 32 for data originates from a client communications device 34. The client communications device 34 may include any computer/communications device utilizing a microprocessor and/or a digital signal processor. The client communications device 34 may include, for example, a computer (laptop, desktop, tablet, server, and other computer systems), a personal digital assistant (PDA), a Global Positioning System (GPS) device, an interactive television, an Internet Protocol (IP) phone, a pager, and/or a cellular/satellite phone. The client communications device 34 may issue the request 32 for data using the communications switch 24, the Public Switched Telephone Network 26, the application server 28, and/or the data network 30. The request 32 for data is communicated via the communications network 22 (e.g., the communications switch 24, the Public Switched Telephone Network 26, and/or the data network 30) to the Analysis Module 20 operating within the application server 28.

Figure 2:
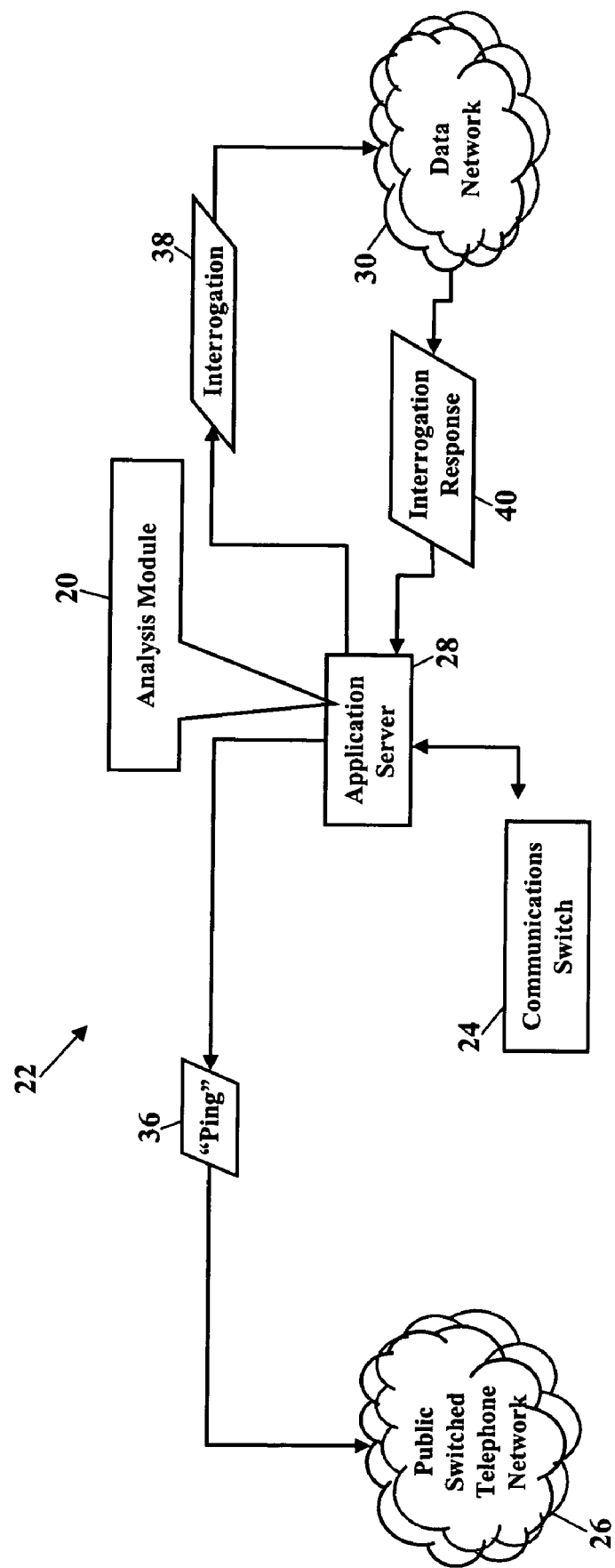
FIGS. 2 and 3 are schematics illustrating the Analysis Module on-demand, dynamically, and in real-time assessing an availability of routing and bandwidth within the communications network, according to more embodiments of this invention.

The embodiments of this invention continue with FIG. 2. When the application server 28 receives the request for data (shown as reference numeral 32 in FIG. 1), the Analysis Module 20 analyzes the request for data and determines what data is requested. The Analysis Module 20 then dynamically, and in real-time, assesses an availability of routing within the communications network 22 to fulfill the request for data. The Analysis Module 20 also dynamically, and in real-time, assesses an availability of bandwidth to fulfill the request for data. That is, each time the client communications device (shown as reference numeral 34 in FIG. 1) requests data, the Analysis Module 20 "on demand" determines the available routing and bandwidth. Because computer/servers and network routes have varying packet capacities, and because some computers/servers experience more congestion than others, the Analysis Module 20 tries to determine the best or preferred scenario for fulfilling the request for data.

FIG. 2 shows various commands, queries, tactics, and instructions for assessing the availability of routing and bandwidth. The Analysis Module 20, for example, may "ping" various computer devices communicating with the application server 28. That is, the Analysis Module 20 sends an addressable "ping" packet 36 to other computer devices communicating with the application server 28. The Analysis Module 20 then measures the elapsed travel time for the "ping" packet 36 to return to the application server 28. The Analysis Module 20 uses the elapsed travel time to determine response times, network congestion, and/or bandwidth. Although FIG. 2 shows the Analysis Module 20 utilizing the "ping" packet 36 via the Public Switched Telephone Network 26, the Analysis Module 20 may also utilize the data network 30 to communicate the "ping" packet 36. The Analysis Module 20 may also issue one or more interrogations 38. Each interrogation 38 is addressed to a particular computer device, and each interrogation asks the particular computer device to assess its activity level. The Analysis Module 20 would then receive an interrogation response 40, and the Analysis Module 20 uses the interrogation response 40 to determine response times, network congestion, and/or bandwidth. Although FIG. 2 also shows the Analysis Module 20 utilizing the interrogation 38 via the data network 30, the Analysis Module 20 may also utilize the Public Switched Telephone Network 26 to communicate the interrogation 38.

Figure 3:
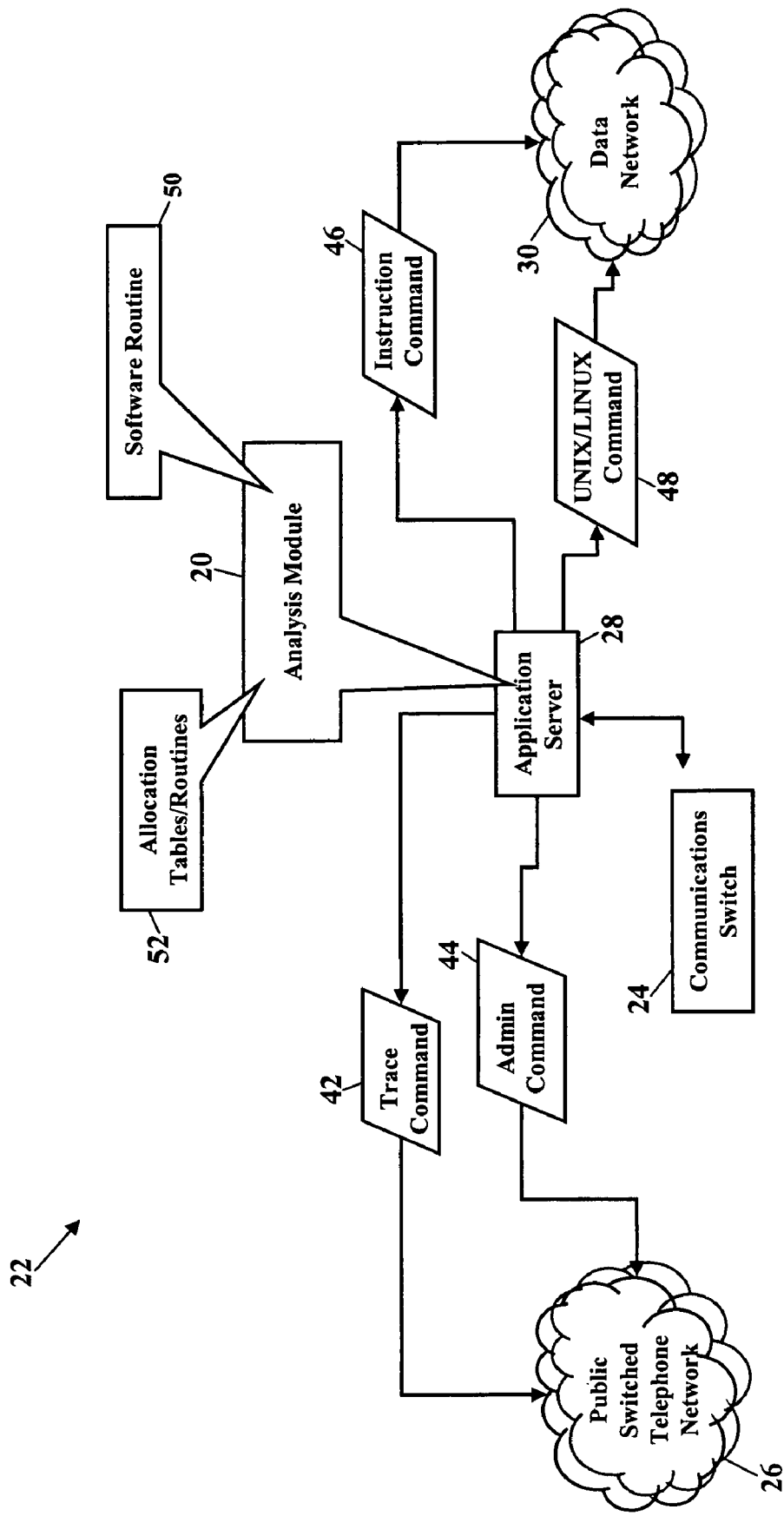

FIG. 3 shows more commands, queries, tactics, and instructions for assessing the availability of routing and bandwidth. The Analysis Module 20 may utilize UNIX/LINUX "trace" commands 42 or tracing features to monitor packet activity within a computer device communicating with the application server 28. The Analysis Module 20 may also utilize administrative ("Admin") commands 44, instruction commands 46, and/or other UNIX/LINUX commands 48 to assess activity within a computer device, within a network path within the communications network 22, and/or within a series of paths within the communications network 22. Although FIG. 3 shows the Analysis Module 20 utilizing either the Public Switched Telephone Network 26 or the data network 30 to communicate the "trace" command 42, the administrative command 44, the instruction command 46, and/or the other UNIX/LINUX command 48, those of ordinary skill in the art understands that the Analysis Module 20m may use one, or both, networks to communicate each command. FIG. 3 also shows the Analysis Module 20 utilizing a software routine 50 to help assess the availability of routing and bandwidth. The software routine 50 autonomously monitors activity within specified path(s), regions, computer devices, and/or the entire communications network 22. The Analysis Module 20 may also utilize allocation tables and/or routines 52 to help assess the availability of routing and bandwidth. These allocation tables and/or routines 52 would contain relationships, preferences, and/or designations for various network routing paths and/or various computer devices. The allocation tables and/or routines 52 would identify, or even mandate, circumstances when certain routings or certain computer devices are required. If, for example, a subscriber wishes to download a large video file, the allocation tables and/or routines 52 may require that a particular network routing, having capacity to communicate the large video file, be utilized. Although the software routine 50, and the allocation tables and/or routines 52, are shown operating as subroutines/subcomponents of the Analysis Module 20, those of ordinary skill in the art now recognize that each may be remotely installed on any computer device communicating with the application server 28.

Figure 4:
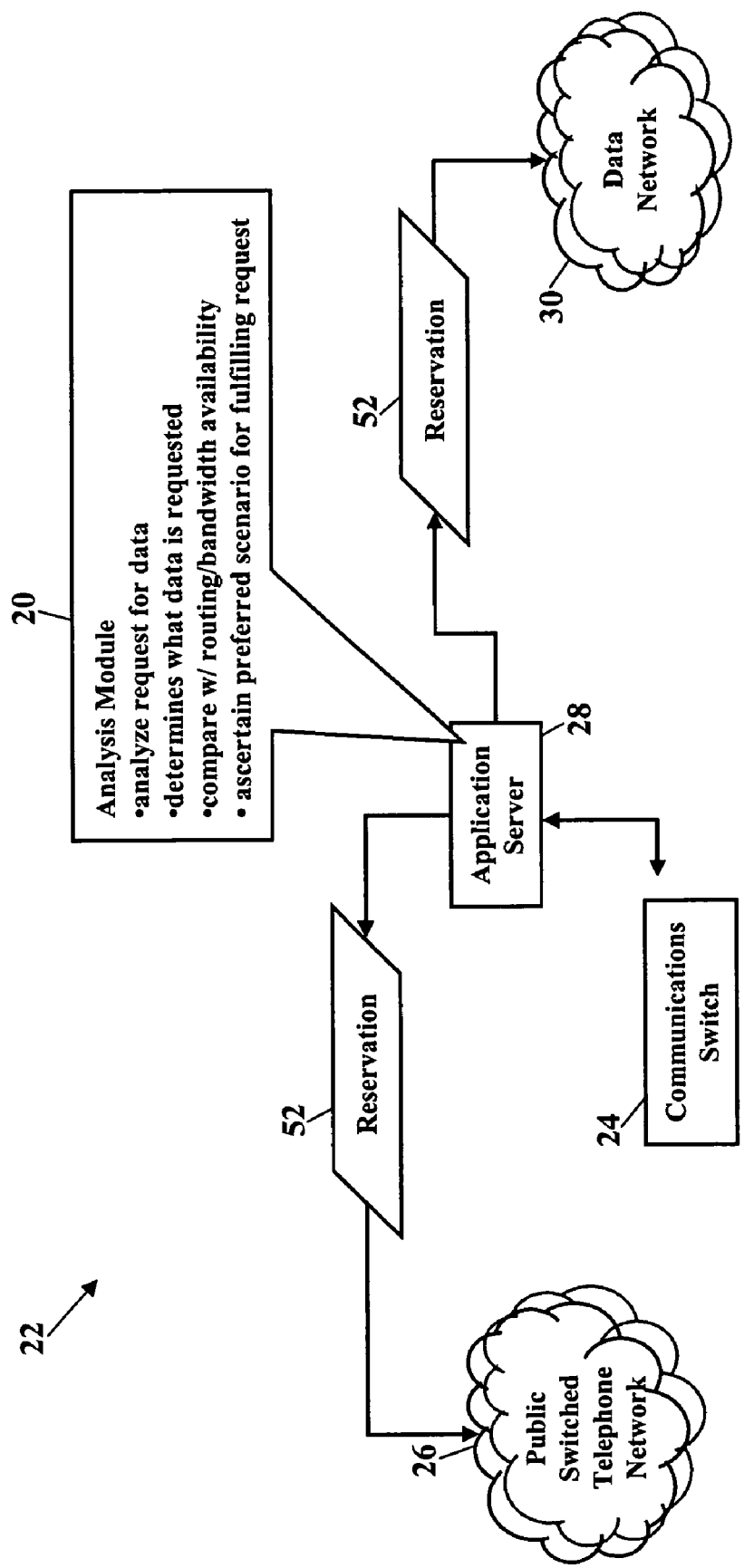
FIG. 4 is a schematic illustrating ascertainment of a preferred scenario of segmentation, dispersion, and assemblage of electronic data, according to still more embodiments of this invention.

Once the Analysis Module 20 assesses the communications network 22, the Analysis Module 20 then determines the best or preferred scenario for fulfilling the request for data. As FIG. 4 shows, the Analysis Module 20 analyzes the request 32 for data, determines what data is requested, and compares the requested data with the on demand, real-time availability of routing and bandwidth within the communications network 22. The Analysis Module 20 then ascertains a preferred scenario of segmentation, dispersion, and assemblage of electronic data to fulfill the request for data. That is, the Analysis Module 20 assesses the highest quality scenario, the most reliable scenario, the most efficient scenario, the most profitable scenario, or, in general terms, the "preferred scenario" for fulfilling the request for data. If, for example, the subscriber requires the highest-possible quality of presentation, the Analysis Module 20 selects a combination of segmentation, dispersion, and assemblage of segments that achieves the highest possible quality of presentation. If, however, the subscriber requires the lowest cost when receiving requested data, the Analysis Module 20 selects a combination of segmentation, dispersion, and assemblage of segments that achieves the lowest possible cost to the subscriber, perhaps despite a degraded quality of transmission (e.g., the subscriber might tolerate "lost" packets of data, delayed delivery of packets, and/or a lesser Quality of Presentation).

As FIG. 4 also shows, the Analysis Module 20 issues one or more reservations 52. Once the Analysis Module 20 assesses the preferred scenario of segmentation, dispersion, and assemblage, the Analysis Module 20 may then "reserve" routing paths and/or computer devices. The Analysis Module 20 issues one or more addressable reservations 52 to help ensure the preferred scenario is accomplished. Each reservation 52 instructs a networked computer device to anticipate, and perhaps only accept, packets of data destined for the reserved paths and/or computer devices. Each reservation 52 may instruct networked computer devices to anticipate, and perhaps only accept, packets having recognized header information and/or packet content. Each reservation 52 may also include a chronology component that specifies a "window" within which the reserved packets must be received, processed, and/or communicated. Packets arriving outside this window may not receive preferential access/routing and would be queued according to more conventional strategies (e.g., sequential, first in-first out, chronological). Because the Analysis Module 20 issues one or more of the addressable reservations 52, the Analysis Module 20 is able to reduce/avoid packet infighting for the "best" path.

Figure 5:
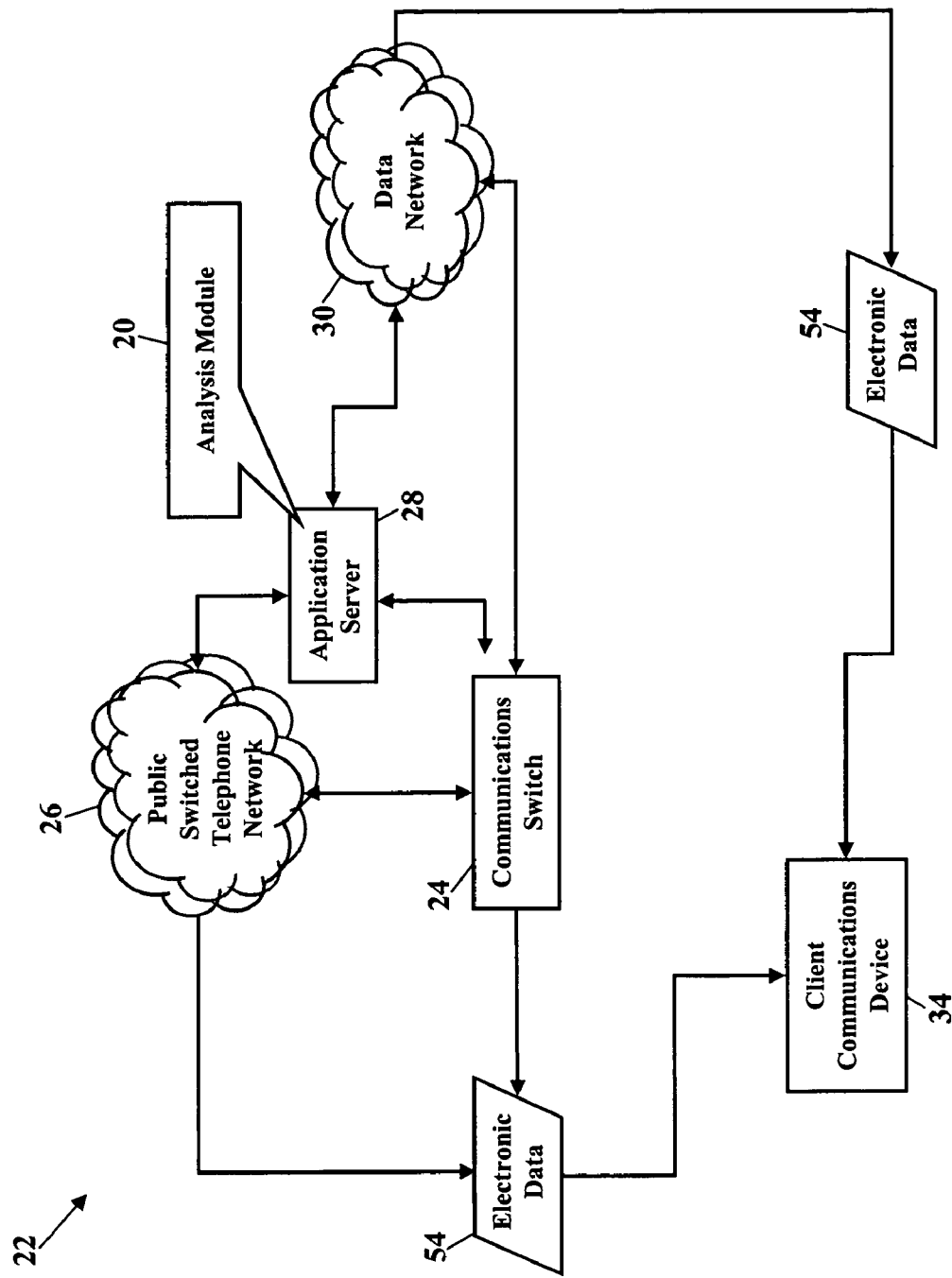
FIG. 5 is a schematic illustrating fulfillment of formatted data according to the preferred scenario determined in FIG. 4.

Now that the preferred scenario is ascertained, FIG. 5 shows the fulfillment of the request. The Analysis Module 20 has analyzed the request for data (shown as reference numeral 32 in FIG. 1), determined what data is requested, and compared the requested data with the real-time availability of routing and bandwidth within the communications network 22. The Analysis Module 20 then ascertained a preferred scenario of segmentation, dispersion, and assemblage of electronic data to fulfill the request for data. The Analysis Module 20 now communicates to the client communications device 34 the electronic data 54 fulfilling the request. Because the electronic data 54 has been at least one of segmented, dispersed for subsequent processing, and then assembled as a data stream, the electronic data 54 has been formatted according to the preferred scenario.

Figure 6:
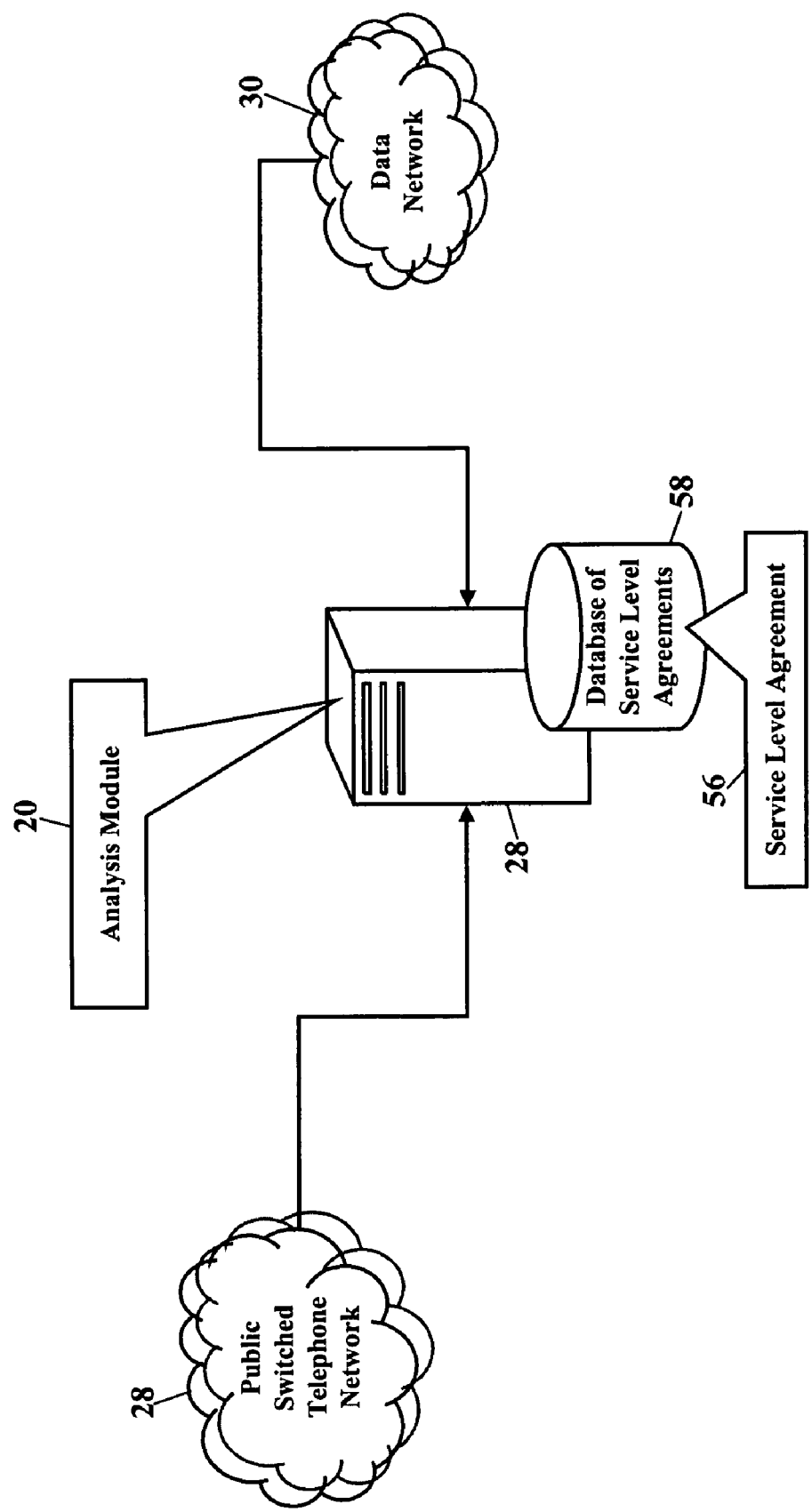
FIGS. 6-10 are schematics illustrating the Analysis Module accessing a Service Level Agreement according to another of the embodiments of this invention.

FIGS. 6-10 are schematics illustrating another of the embodiments of this invention. FIG. 6 shows the Analysis Module 20 accessing a Service Level Agreement 56. The Service Level Agreement 56 is an agreement defining one or more parameters for the communications service(s) provided on behalf of the subscriber. The Service Level Agreement 56 may be an agreement by and between the subscriber and a communications service provider. The Service Level Agreement 56 defines how the subscriber wishes to receive electronic data, in what format that electronic data is delivered, when the electronic data is delivered, and to what device (or along what network path) that electronic data is delivered. The Service Level Agreement 56 might define pricing for various bandwidth needs, network utilization, delivery times, and processing charges. Because Service Level Agreements are, in general, known in the art, and because the content of the Service Level Agreement 56 may greatly vary, this patent will not further explain the Service Level Agreement 56.

Figure 7:
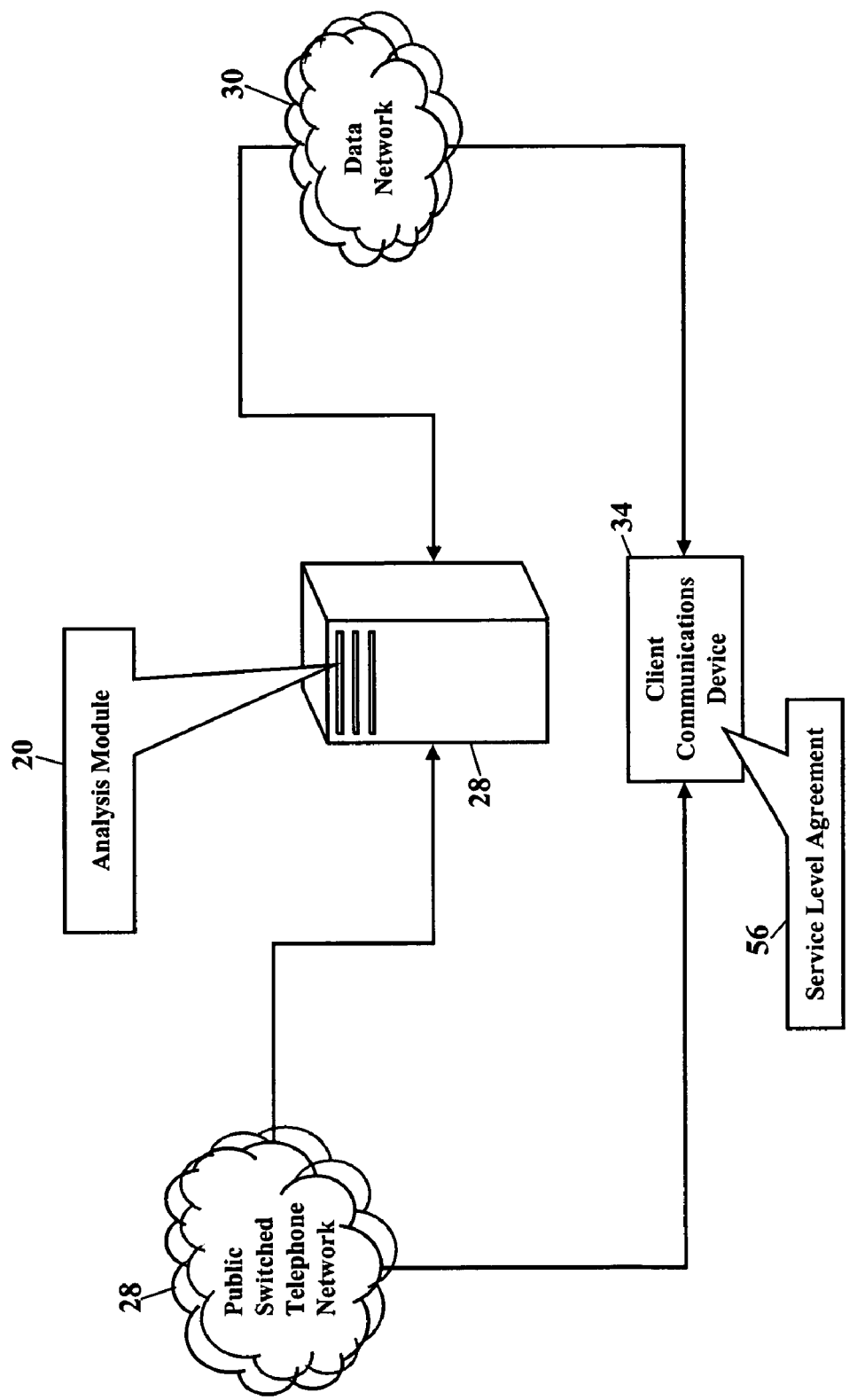

FIGS. 6 and 7 also illustrate the Analysis Module 20 accessing the Service Level Agreement 56. FIG. 6 shows that an electronic version of the Service Level Agreement 56 may be stored/maintained in a database 58 of Service Level Agreements. The database 58 of Service Level Agreements stores multiple Service Level Agreements for multiple subscribers; each Service Level Agreement corresponds to at least one subscriber. While the database 58 of Service Level Agreements may be stored/maintained on any computer device communicating with the Public Switched Telephone Network 26 and/or the data network 30, FIG. 6 shows the database 58 of Service Level Agreements stored/maintained within memory of the application server 28. FIG. 7 illustrates that the Service Level Agreement 56 may be locally stored in memory on the client communications device 34. When the Analysis Module 20 accesses the Service Level Agreement 56, the Analysis Module 20 may initiate wired and/or wireless communication with the client communications device 34 via the Public Switched Telephone Network 26 and/or the data network 30.

Figure 8:
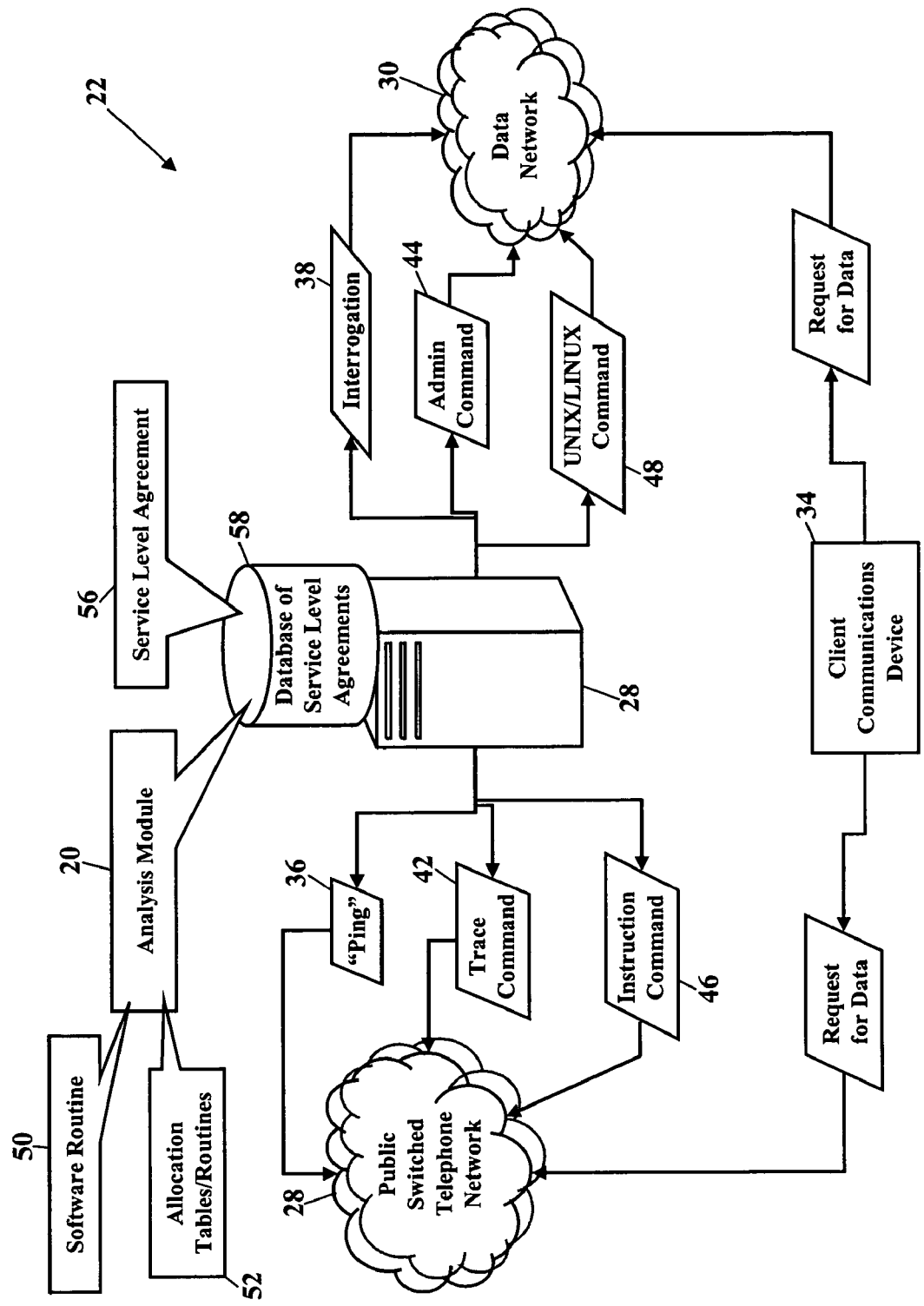

FIG. 8 shows the Analysis Module 20 assessing the availability of routing and bandwidth. The Analysis Module 20 receives the request 32 for data from the client communications device 34. As this patent earlier explained, the Analysis Module 20 may utilize the "ping" packet 36, the interrogation 38, the UNIX/LINUX "trace" command 42, the administrative ("Admin") command 44, the instruction command 46, and/or other UNIX/LINUX commands 48 to assess activity within a computer device, within a network path within the communications network 22, and/or within a series of paths within the communications network 22. The Analysis Module 20 may also utilize the software routine 50 and allocation tables and/or routines 52 to help assess the availability of routing and bandwidth.

Figure 9:
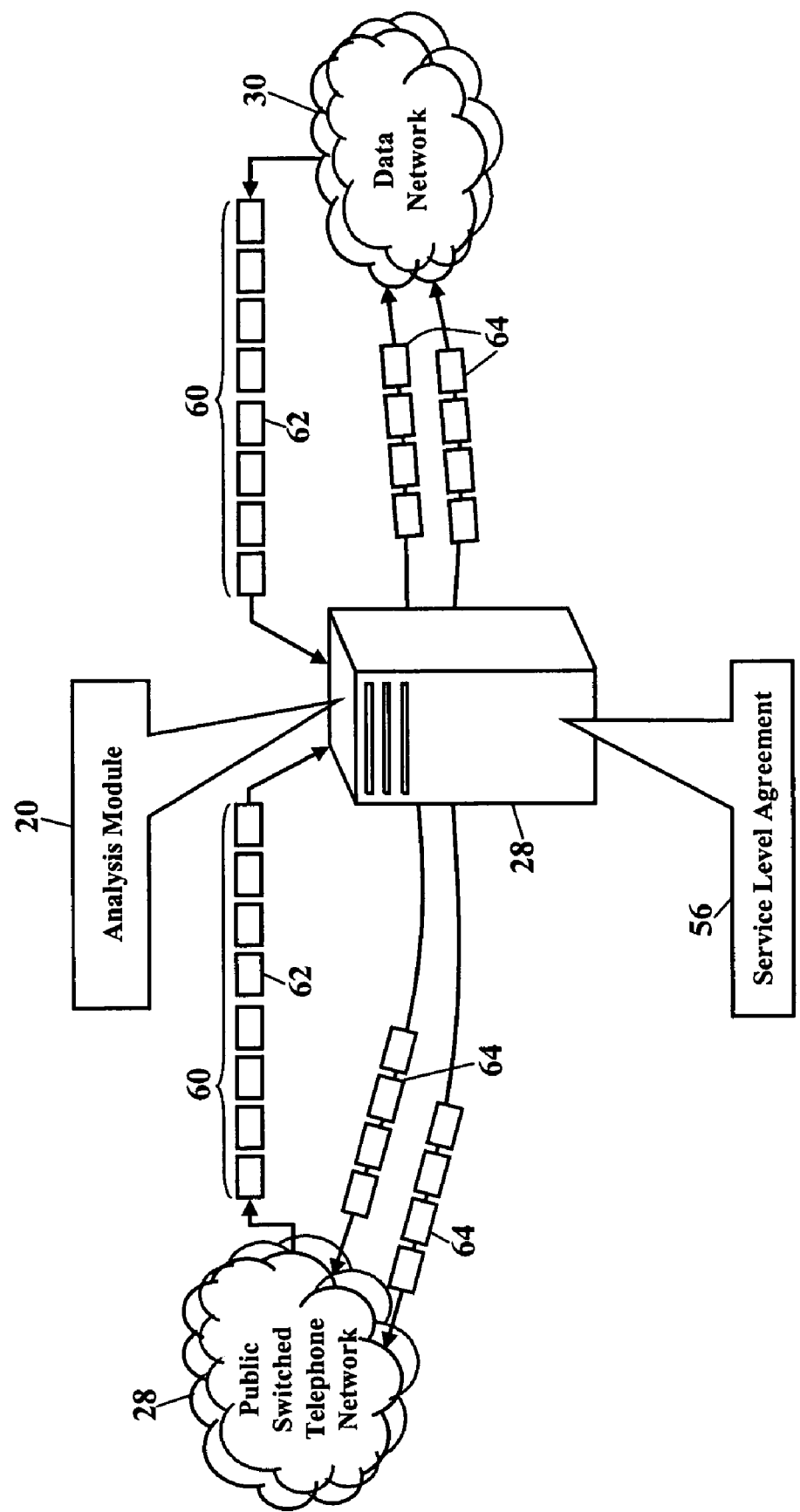

FIG. 9 shows the Analysis Module 20 formatting data according to the Service Level Agreement 56. The Analysis Module 20 receives a first stream 60 of data via the Public Switched Telephone network 28 and/or via the data network 30. The first stream 60 of data typically includes individual packets 62 of information. The Analysis Module 20 acts upon the first stream 60 of data by segmenting the individual packets 62 into segments 64 according to the Service Level Agreement 56. Once a segment 64 is created, if the segment 64 requires subsequent processing, the Analysis Module 20 then disperses that segment 64 for a subsequent processing service. The Analysis Module 20 routes the segment 64 to other devices and/or locations via the Public Switched Telephone network 28 and/or via the data network 30, and the subsequent processing service is performed. If the Service Level Agreement 56 specifies how the segment 64 should be dispersed, or where that segment 64 should be routed, the Analysis Module 20 routes the segment 64 according to the Service Level Agreement 56.

Figure 10:
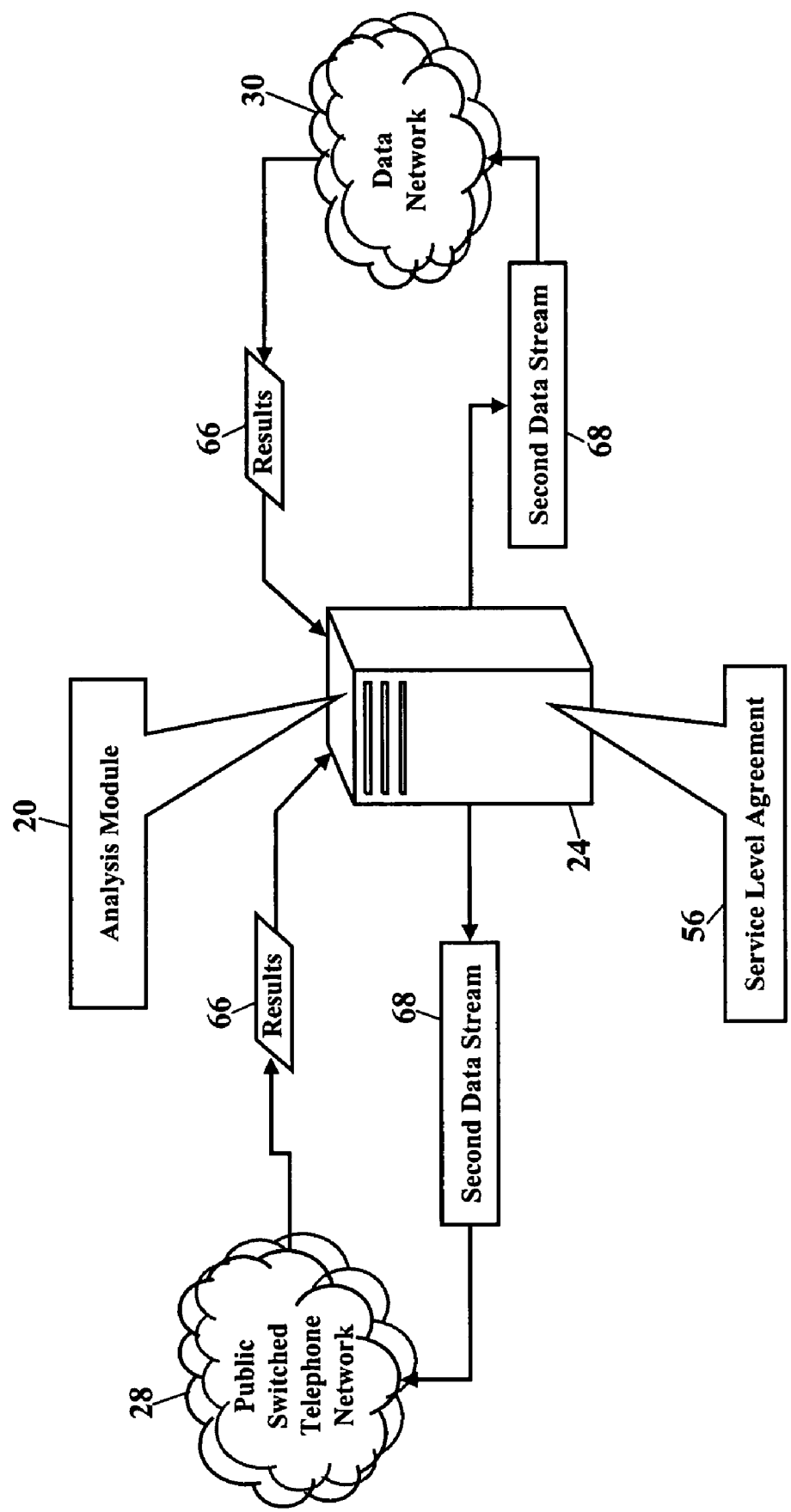

As FIG. 10 shows, the Analysis Module 20 receives the results 66 of the subsequent processing services. When the subsequent processing service is complete, the Analysis Module 20 aggregates the result(s) 66 of the subsequent processing service(s). The Analysis Module 20 may also access the Service Level Agreement 56 to determine how the subscriber wants the results 66 assembled, formatted, and/or communicated. The Analysis Module 20 then assembles those results 66, and any unprocessed segments 64, into a second data stream 68. As FIG. 10 shows, the second data stream 68 is typically communicated via the Public Switched Telephone network 28 and/or via the data network 30 to another destination. That is, the second data stream 68 may be communicated to another computer device, and/or the second data stream 68 may be communicated to a client communications device (not shown for simplicity). The client communications device may then view/execute/present the second data stream 68. Because the Analysis Module 20 consulted the Service Level Agreement 56, the second data stream 68 has been substantially formatted, assembled, and communicated to the requirements/desires of the subscriber. That is, the second data stream 68 has been segmented, dispersed, formatted, transformed, encrypted, scaled, compressed, manipulated, assembled, and/or communicated to suit the subscriber's needs, as specified in the Service Level Agreement 56.

Figure 11:
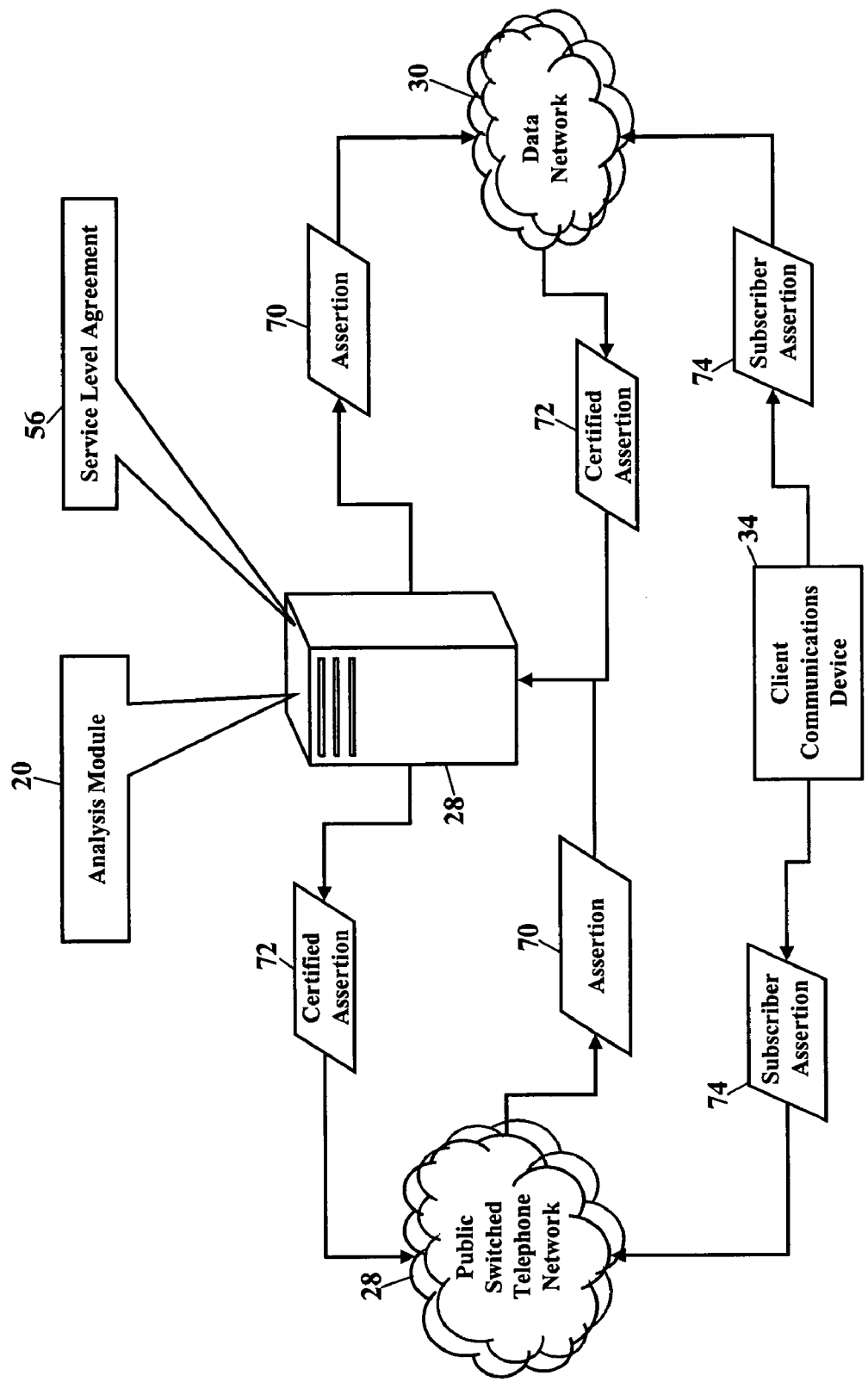
FIG. 11 is a schematic illustrating one or more assertions that indicate the requirements of the Service Level Agreement were satisfied according to more embodiments of this invention.

FIG. 11 is a schematic illustrating still more embodiments of this invention. FIG. 11 shows one or more assertions 70. These assertions 70 indicate that the requirements of the Service Level Agreement 56 were satisfied. When the Analysis Module 20 segments, disperses, and assembles data, each assertion 70 confirms that the segmentation, dispersion, and assemblage were performed according to the requirements of the Service Level Agreement 56. The assertions 70 may be sent and received amongst "tier one" service providers and lesser tiered service providers. A first tier service provider, for example, may subcontract some aspect of subsequently processing the segment (shown as reference numeral 64 in FIG. 9). When the subcontractor correctly processed the segment according to the requirements of the Service Level Agreement 56, the first tier service provider would then issue the assertion 70. The subcontractor could then utilize the assertion 70 in advertising, in marketing, and in other efforts to show their commitment to service, performance, and customer requirements.

FIG. 11 also shows a certified assertion 72. The certified assertion 72 still confirms that the requirements of the Service Level Agreement 56 were satisfied. The certified assertion 72, however, is encrypted, digitally "watermarked," keyed, or otherwise secured to reduce the incidence of fraudulent assertions. Because the concept of assertions may be important to winning, and maintaining, service contracts, some service providers will inevitably attempt to copy, imitate, or even forge assertions. The certified assertion 72, then, would include security capabilities to reduce, or even prevent, the instances of copied, imitated, or, in general, "forged" assertions. The certified assertion 72 could even be used to confirm the identity of the subscriber and the subscriber's ability to pay (e.g., account balance, payment history, accumulation of assertions).

FIG. 11 also shows a subscriber assertion 74. The subscriber assertion 74 is communicated from the client communications device. The subscriber assertion 74 again confirms that the requirements of the Service Level Agreement 56 were satisfied. Here, however, the subscriber assertion 74 is provided by the subscriber. The subscriber assertion 74 acts as "feedback" from the subscriber and, again, may be used in advertising, in marketing, and in other efforts to show a commitment to service, performance, and customer requirements. As many subscribers provide more and more subscriber assertions 74, the volume of subscriber assertions 74 acts as an indication of trust. The more subscriber assertions 74 a service provider acquires, the more "trusted" is the service provider to satisfy whatever a subscriber's Service Level Agreement may require.

The subscriber may be required to provide the subscriber assertion 74. Because the subscriber assertion 74 may act as "feedback," and thus may be very useful for advertising and marketing efforts, a service provider may require that all subscribers provide the subscriber assertion 74. If the service provider satisfies the subscriber's Service Level Agreement, the subscriber is required to communicate the subscriber assertion 74. The subscriber may be required to communicate the subscriber assertion 74 to the tier one service provider. The subscriber may also be required to communicate the subscriber assertion 74 to each lesser-tiered service provider. A service provider may even deny service for any subscriber or user that will not provide the subscriber assertion 74. Because the subscriber assertion 74 may even be used to confirm the identity of the subscriber and the subscriber's ability to pay, the service provider may further deny service for any subscriber not providing the subscriber assertion 74. The service provider may refuse to provide service when the service provider cannot confirm the identity of the requester and/or an ability to pay.

Figure 12:
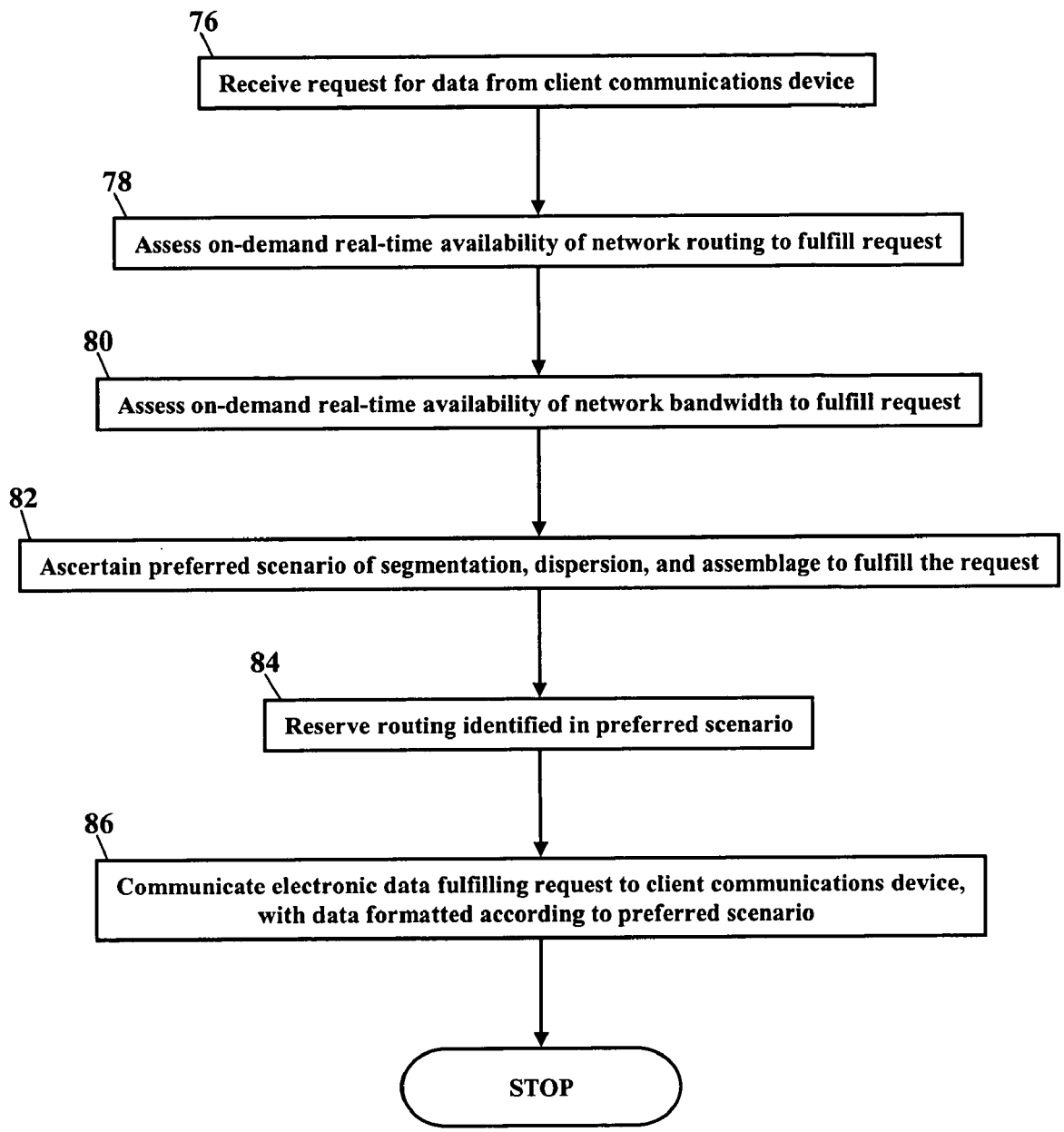
FIGS. 12-14 are flowcharts illustrating methods of providing communications services according to still more embodiments of this invention.

FIG. 12 is a flowchart illustrating a method of providing communications services. A request for data is received (Block 76), and the request for data originates from a client communications device. The real-time availability of network routing is assessed to fulfill the request (Block 78). The real-time availability of network bandwidth is also assessed to fulfill the request (Block 80). A preferred scenario of segmentation, dispersion, and assemblage of electronic data is ascertained to fulfill the request (Block 82). A routing identified in the preferred scenario is reserved (Block 84). Electronic data fulfilling the request is then communicated to the client communications device (Block 86), and the electronic data is formatted according to the preferred scenario.

Figure 13:
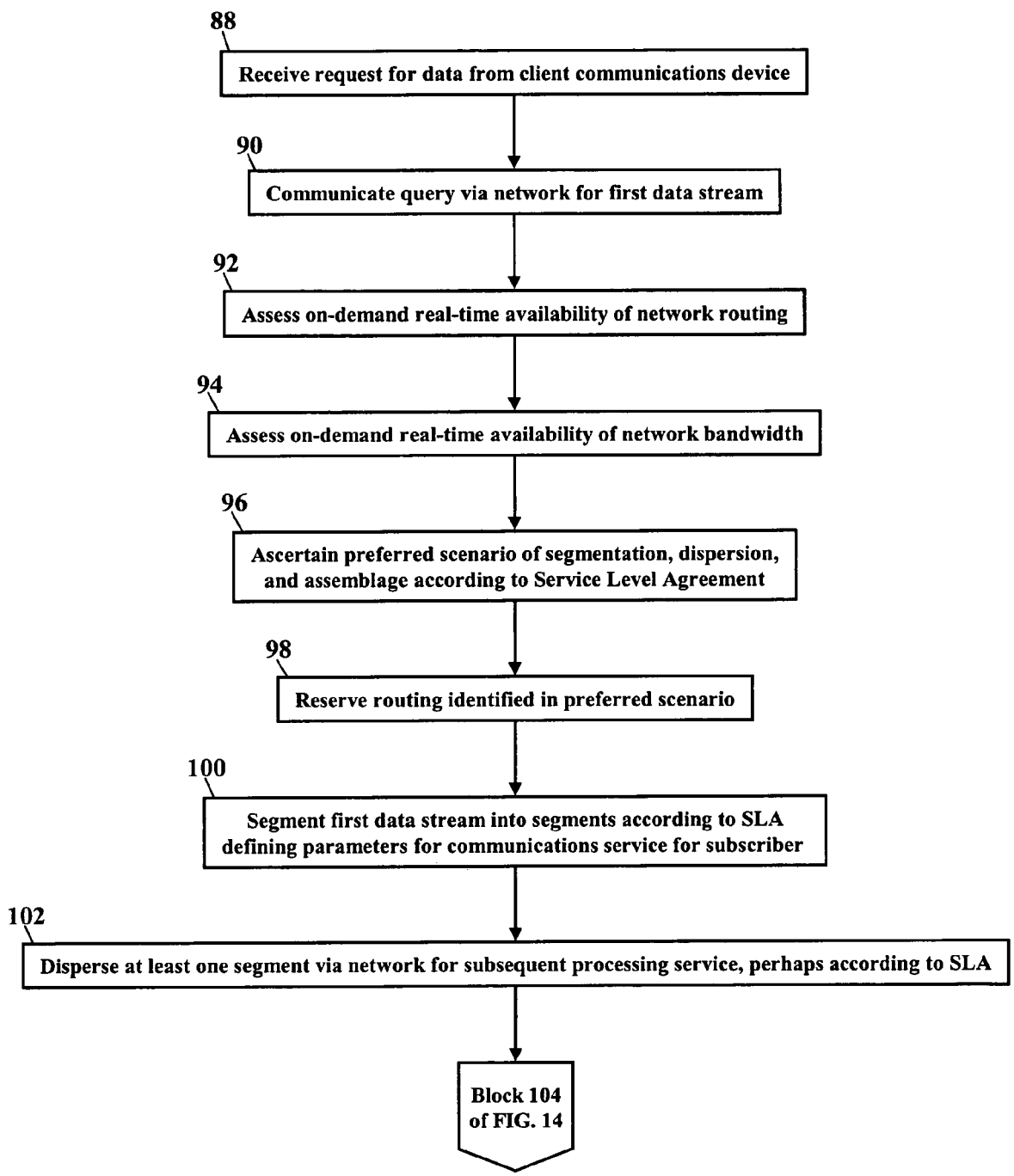

FIG. 13 is a flowchart illustrating another method of providing communications services. A request for electronic data is received (Block 88). The request originates from a client communications device. A query is communicated via a network for a first data stream (Block 90). The first data stream is received at a computer, and the first data stream includes packets of data packetized according to a packet protocol (Block 92). The on-demand, real-time availability of network routing is assessed (Block 94), and the on-demand, real-time availability of network bandwidth is also assessed (Block 96). A preferred scenario of segmentation, dispersion, and assemblage of electronic data is ascertained according to the Service Level Agreement (Block 98). A routing identified in the preferred scenario is reserved (Block 100). The first data stream is then segmented into segments according to the Service Level Agreement (SLA) (Block 102). The Service Level Agreement is an agreement defining parameters for communications service for the subscriber. At least one segment is dispersed via the network for a subsequent processing service, perhaps according to the Service Level Agreement (Block 104).

Figure 14:
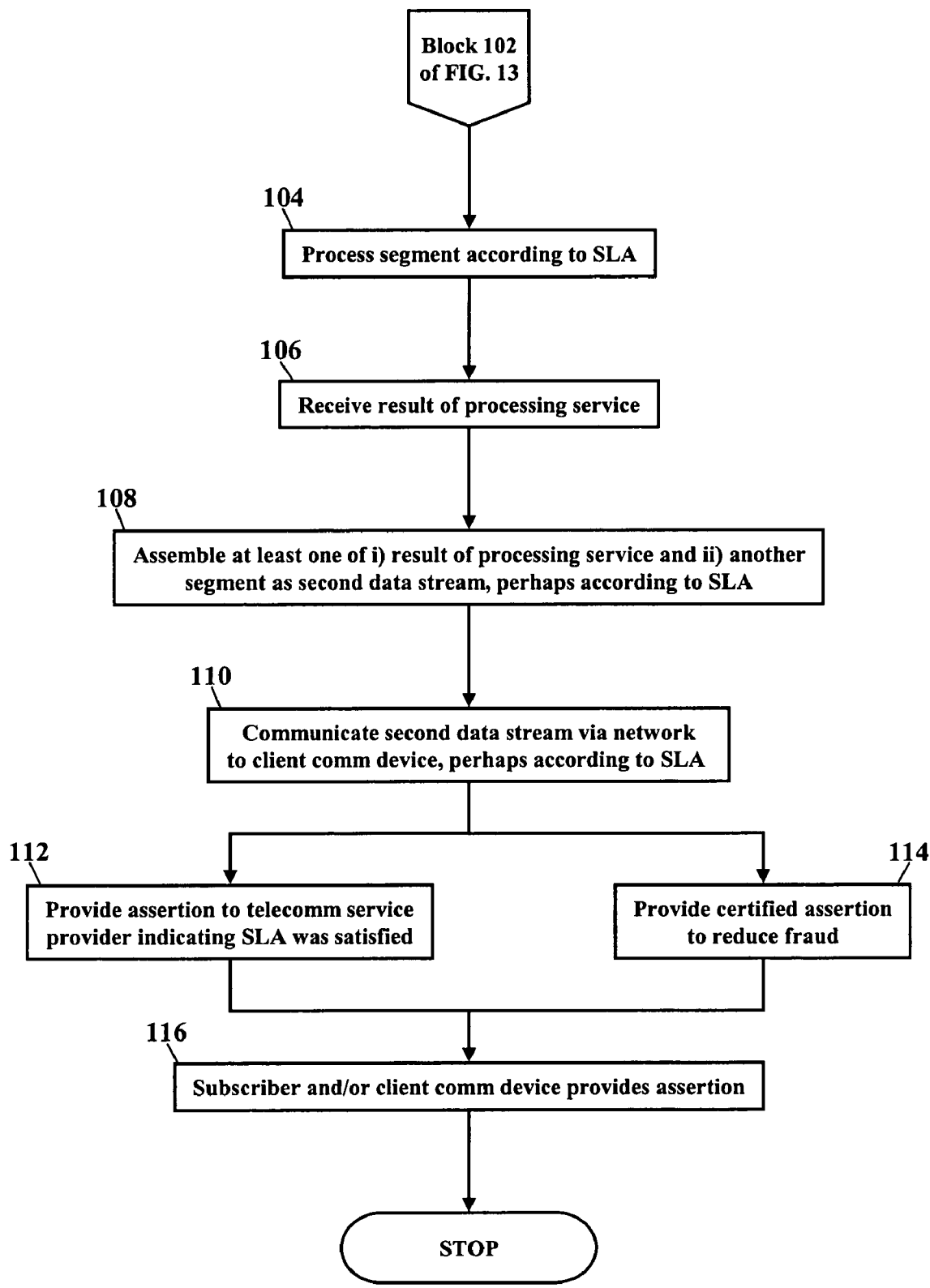

The flowchart continues with FIG. 14. A result of the processing service is received (Block 106) and assembled as a second data stream, perhaps according to the Service Level Agreement (Block 108). The second data stream includes at least one of i) the result of the processing service and ii) another segment. The second data stream is then communicated via the network (Block 110) to a client communications device, perhaps according to the Service Level Agreement. An assertion may be provided to a communications service provider, and the assertion indicates that the Service Level Agreement was satisfied (Block 112). The assertion may be certified to reduce the incidence of fraudulent assertions (Block 114). The subscriber may also provide the assertion (Block 116).

The Analysis Module (shown as reference numeral 20 in FIGS. 1-11) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Analysis Module to be easily disseminated. A computer program product for providing communications services includes the Analysis Module stored on the computer-readable medium. The Analysis Module segments a first data stream into segments according to a Service Level Agreement. The Analysis Module disperses at least one segment via a network for a subsequent processing service, and the Analysis Module receives a result of the processing service. The Analysis Module assembles a second data stream, and the second data stream includes at least one of i) the result of the processing service and ii) another segment. The Analysis Module then communicates the second data stream via the network.

The Analysis Module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services, comprising:
   receiving a request for data;
   assessing in real-time an availability of network routing to fulfill the request;
   assessing in real-time an availability of network bandwidth to fulfill the request;
   ascertaining a preferred scenario of segmentation, dispersion, and assemblage of electronic data to fulfill the request;
   sending a reservation to reserve a routing path, the reservation instructing a device to only accept packets of data destined for that routing path, the reservation specifying a window of time in which the packets of data are received and processed;
   receiving a data stream to fulfill the request;
   determining a subcontracted processing service is required from a different service provider;
   recursively segmenting the data stream into segments, such that a characteristic of a preceding segment determines how a current segment is segmented;
   grouping together individual packets of data as a new segment that requires the subcontracted processing service;
   subcontracting the new segment via a network to the different service provider to receive the subcontracted processing service;
   receiving a result of the processing service;
   assembling formatted data comprising the result of the subcontracted processing service and at least one of the recursively segmented segments; and
   communicating the formatted data to fulfill the request.

2. A method according to claim 1, wherein ascertaining the preferred scenario comprises assessing a highest quality scenario and a lowest cost scenario, the highest quality scenario describing a combination of segmentation, dispersion, and assemblage of segments that achieves a highest quality of presentation, and the lowest cost scenario describing another combination of segmentation, dispersion, and assemblage of segments that achieves a lowest cost, despite degraded quality.

3. A method according to claim 1, further comprising issuing an assertion to a different service provider that indicates the different service provider correctly performed the processing service according to a Service Level Agreement.

4. A method according to claim 3, wherein the assertion is certified to reduce the incidence of fraudulent assertions.

5. A method according to claim 3, further comprising receiving an assertion that confirms the Service Level Agreement was satisfied.

6. A method according to claim 5, further comprising receiving a volume of assertions from subscribers as indications of trust that each subscriber's Service Level Agreement will be satisfied.

7. A method according to claim 5, wherein when the service level agreement is satisfied, and the subscriber fails to provide the assertion, then further comprising denying communications services to the subscriber.

8. A method according to claim 1, further comprising ascertaining a highest quality scenario that describes a combination of segmentation, dispersion, and assemblage of segments that achieves a highest quality of presentation.

9. A method according to claim 1, further comprising ascertaining a lowest cost scenario that describes a combination of segmentation, dispersion, and assemblage of segments that achieves a lowest cost.

10. A method according to claim 1, further comprising ascertaining a most profitable scenario that describes a combination of segmentation, dispersion, and assemblage of segments that achieves a highest profit.

11. A method according to claim 3, further comprising processing a segment according to the Service Level Agreement.

12. A system, comprising:

means for receiving a request for data;

means for assessing in real-time an availability of network routing to fulfill the request;

means for assessing in real-time an availability of network bandwidth to fulfill the request;

means for ascertaining a preferred scenario of segmentation, dispersion, and assemblage of electronic data to fulfill the request;

means for sending a reservation to reserve a routing path, the reservation instructing a device to only accept packets of data destined for that routing path, the reservation specifying a window of time in which the packets of data are received and processed;

means for receiving a data stream to fulfill the request;

means for determining a subcontracted processing service is required from a different service provider;

means for recursively segmenting the data stream into segments, such that a characteristic of a preceding segment determines how a current segment is segmented;

means for grouping together individual packets of data as a new segment that requires the subcontracted processing service;

means for subcontracting the new segment via a network to the different service provider to receive the subcontracted processing service;

means for receiving a result of the subcontracted processing service;

means for assembling formatted data comprising the result of the subcontracted processing service and at least one of the recursively segmented segments; and means for communicating the formatted data to fulfill the request.

13. A computer program product comprising computer readable media storing processor executable instructions for performing a method of providing communications services, the method comprising:

receiving a request for data;

assessing in real-time an availability of network routing to fulfill the request;

assessing in real-time an availability of network bandwidth to fulfill the request;

ascertaining a preferred scenario of segmentation, dispersion, and assemblage of electronic data to fulfill the request;

sending a reservation to reserve a routing path, the reservation instructing a device to only accept packets of data destined for that routing path, the reservation specifying a window of time in which the packets of data are received and processed;

receiving a data stream to fulfill the request;

determining a subcontracted processing service is required from a different service provider;

recursively segmenting the data stream into segments, such that a characteristic of a preceding segment determines how a current segment is segmented;

grouping together individual packets of data as a new segment that requires the subcontracted processing service;

subcontracting the new segment via a network to the different service provider to receive the subcontracted processing service;

receiving a result of the subcontracted processing service;

assembling formatted data comprising the result of the subcontracted processing service and at least one of the recursively segmented segments; and communicating the formatted data to fulfill the request.

* * * * *